(12) United States Patent
Lin et al.

(10) Patent No.: US 7,330,218 B2
(45) Date of Patent: Feb. 12, 2008

(54) ADAPTIVE BIDIRECTIONAL FILTERING FOR VIDEO NOISE REDUCTION

(75) Inventors: Peng Lin, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 594 days.

(21) Appl. No.: 10/934,025

(22) Filed: Sep. 2, 2004

(65) Prior Publication Data

US 2006/0044475 A1    Mar. 2, 2006

(51) Int. Cl.
*H04N 5/21* (2006.01)
*H04N 5/14* (2006.01)

(52) U.S. Cl. ............... 348/619; 348/701; 348/910

(58) Field of Classification Search ............. 348/619, 348/620, 910, 700, 701; 382/261, 275
See application file for complete search history.

(56) References Cited

U.S. PATENT DOCUMENTS

| 5,442,407 | A | * | 8/1995 | Iu | 348/620 |
|---|---|---|---|---|---|
| 5,600,731 | A | * | 2/1997 | Sezan et al. | 382/107 |
| 5,689,305 | A | * | 11/1997 | Ng et al. | 375/240.15 |
| 6,175,657 | B1 | * | 1/2001 | Mancuso et al. | 382/261 |
| 6,757,022 | B2 | * | 6/2004 | Wredenhagen et al. | 348/452 |
| 2004/0095511 | A1 | * | 5/2004 | Amara et al. | 348/620 |
| 2005/0094889 | A1 | | 5/2005 | Lin et al. | |
| 2006/0159173 | A1 | * | 7/2006 | Ye et al. | 375/240.16 |

* cited by examiner

*Primary Examiner*—Victor R. Kostak
(74) *Attorney, Agent, or Firm*—Kenneth L. Sherman, Esq.; Michael Zarrabian, Esq.; Myers Dawes Andras & Sherman, LLP

(57) ABSTRACT

A video noise reduction system for reducing video noise in a sequence of video frames. In the video noise reduction system, a temporal filter computes multiple temporal average values for the video frames in different temporal directions. A motion detector computes multiple motion signal values for the video frames in different temporal directions. Finally, a control unit selects one of the temporal average values based on the motion signal values as output.

26 Claims, 4 Drawing Sheets

ADAPTIVE BIDIRECTIONAL FILTERING FOR VIDEO NOISE REDUCTION

FIELD OF THE INVENTION

The present invention relates generally to video processing, and more particularly to noise reduction in video signals.

BACKGROUND OF THE INVENTION

Motion adaptive noise reduction is an effective video noise reduction method that is widely used. In such a conventional method, a motion detector is used to detect motion among the current video frame and its neighboring frames for every pixel in the video frame to generate a motion signal. The motion signal indicates the motion area and non-motion area within the current video frame, and is used to control temporal filtering for noise reduction. For the non-motion area, a temporal filter which takes the average of the corresponding pixels of the current frame and its neighboring frames, is utilized to reduce the video noise. For the motion area the temporal filter is switched off to avoid motion blurring.

A drawback of the conventional motion adaptive noise reduction method is what is know as a tailing effect, which appears as a noise tail following a moving object. The tailing is caused by switching off the temporal filter when the motion signal indicates motion. An existing method used in noise reduction system to handle the tailing effect is to apply a spatial filter to filter the motion area. When the motion signal indicates motion, instead of just switching off the temporal filter, the noise reduction system switches to a spatial filter.

However, due to different characteristics of the temporal filter and the spatial filter, when the filtered video sequence is viewed frame by frame, the temporal filtered area and the spatial filtered area look different. Further, when the filtered video sequence is played, flicker appears in the spatial filtered area because the residual noise of spatial filter at a given pixel changes from frame to frame. As such, simply switching from a temporal filter to a spatial filter can not solve the tailing problem, rather the tailing problem looks different and less obvious.

BRIEF SUMMARY OF THE INVENTION

The present invention addresses the above mentioned shortcomings. In one embodiment the present invention provides an adaptive bidirectional filter for video noise reduction, comprising a bidirectional temporal filter, a motion detector, and a filter control unit. The bidirectional temporal filter generates three temporal averaging values: a total average, a forward average, and a backward average. The total average is the temporal average of the center frame and its forward (past) and backward (future) neighboring frames within a time interval. The forward average is the temporal average of the center frame and its forward (past) neighboring frames within the time interval. The backward average is the temporal average of the center frame and its backward (future) neighboring frames within the time interval.

The motion detector detects motion among the center frame and its neighboring frames within the time interval. The motion detector generates three motion signals: a total motion signal, a forward motion signal, and a backward motion signal. The total motion signal indicates the motion among the center frame and all of its forward and backward neighboring frames within the time interval. The forward motion signal indicates the motion among the center frame and its forward neighboring frames within the time interval. The backward motion signal indicates the motion among the center frame and its backward neighboring frames within the time interval. The motion detector can use global noise statistics, which can be calculated using a separate noise estimation unit.

The filter control unit determines which temporal average to use as the final output based on the three motion signals generated by the motion detector. Generally, if the total motion signal is small, then the total average is chosen as the final output. Otherwise, the filter control unit further checks the forward motion signal. If the forward motion signal is small, then the forward average is chosen as the final output. Otherwise, the filter control unit further checks the backward motion signal. If the backward motion signal is small, then the backward average is chosen as the final output. Otherwise, the filter control unit switches off the temporal filter, and the pixel value of the center frame is bypassed as the final output.

When an object is moving along a certain direction in a video sequence, the forward motion signal indicates motion at the moving boundary behind the moving object in the current frame. In this case, the forward average can not be used, leaving the noise tail behind the moving object. However, in this situation, there is no motion at the same boundary location in the following (future) frames. Therefore, the backward motion signal indicates no motion, and when the backward average is applied, the noise tail is essentially removed according to an embodiment of the present invention.

Other features and advantages of the present invention will be apparent from the following specification taken in conjunction with the following drawings.

DETAILED DESCRIPTION OF THE INVENTION

Figure 1:
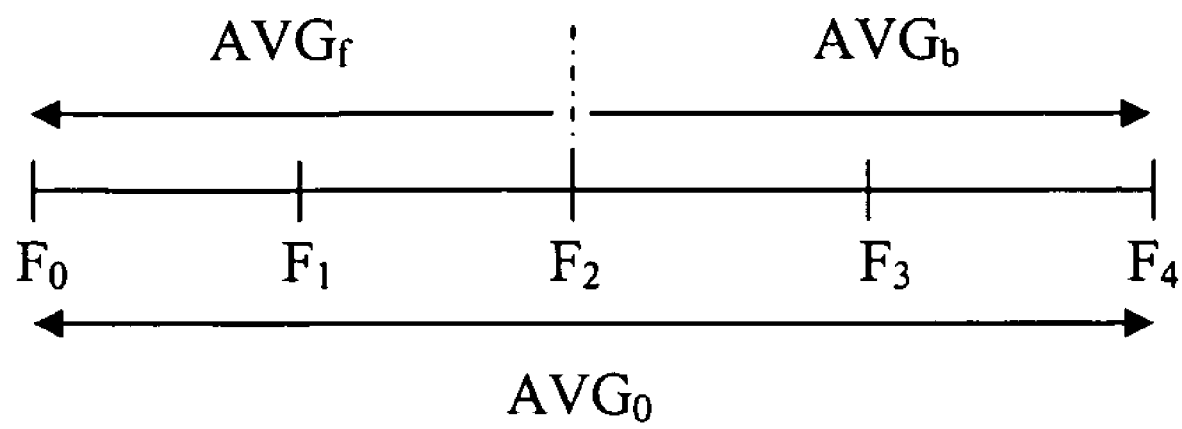
FIG. 1 shows an example process of bidirectional temporal filtering using five video frames, according to an embodiment of the present invention.

Referring to FIG. 1, according to an embodiment of the present invention, an adaptive bidirectional filtering method using N frames ($F_0, F_1, F_2, \ldots, F_{N-1}$) for temporal filtering is based on three motion signals: a total motion signal, a forward motion signal, and a backward motion signal. The total motion signal indicates the motion among all the N frames. The forward motion signal indicates the motion among the center frame and its forward (past) neighboring frames. In addition, the backward motion signal indicates the motion among the center frame and its backward (future) neighboring frames.

Further, three temporal averaging values are computed: a total average, a forward average, and a backward average.

The total average is the temporal average of all the N frames. The forward average is the temporal average of the center frame and its forward neighboring frames. The backward average is the temporal average of the center frame and its backward neighboring. FIG. 1 shows an example bidirectional temporal filtering method for e.g. N=5 frames ($F_0$, $F_1$, $F_2$, $F_3$, $F_4$), wherein $F_2$ is the center frame, $AVG_0$ is the total average, $AVG_f$ is the forward average, and $AVG_b$ is the backward average.

In one example, if the total motion signal is small, then the total average is chosen as the final output, otherwise, the forward motion signal is checked. If the forward motion signal is small, then the forward average is chosen as the final output, otherwise, the backward motion signal is checked. If the backward motion signal is small, then the backward average is chosen as the final output, otherwise, temporal filtering is switched off, and the pixel value of the center frame is bypassed as the final output.

Figure 2:
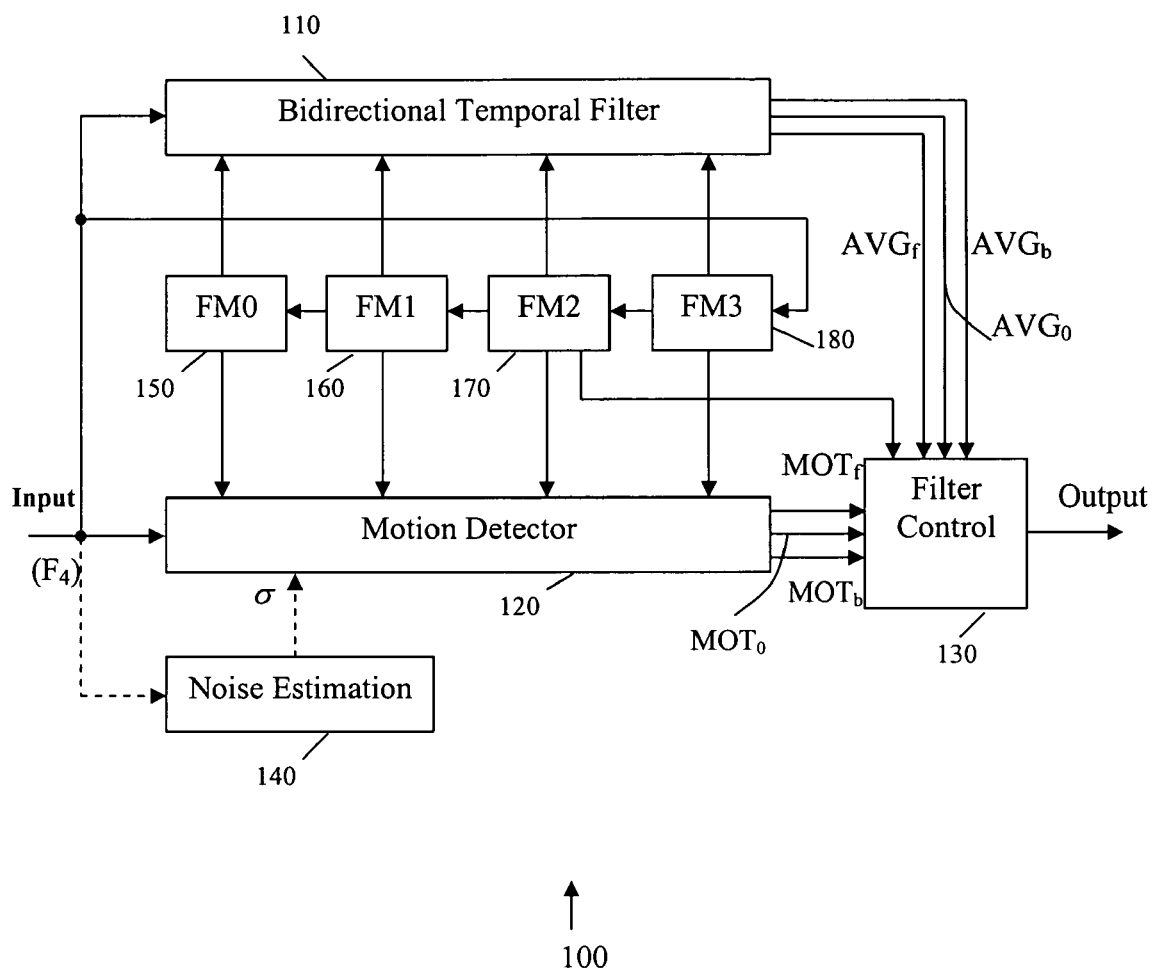
FIG. 2 shows an example functional block diagram of an embodiment of an adaptive bidirectional filtering system according to the present invention.

FIG. 2 shows a block diagram of an example adaptive bidirectional filtering noise reduction system 100 implementing the above method according to an embodiment of the present invention. The system 100 comprises a bidirectional temporal filter 110, a motion detector 120, and a filter control unit 130. The bidirectional temporal filter 100 generates the three temporal averaging values: the total average $AVG_0$, the forward average $AVG_f$, and the backward average $AVG_b$. The total average $AVG_0$ is the temporal average of the center frame and its forward (past) and backward (future) neighboring frames within a predefined time interval N. The forward average $AVG_f$ is the temporal average of the center frame and its forward (past) neighboring frames within the time interval. The backward average $AVG_b$ is the temporal average of the center frame and its backward (future) neighboring frames within the time interval.

The motion detector 120 detects motion among the center frame and its neighboring frames within the time interval. The motion detector 120 generates the three motion signals: the total motion signal $MOT_0$, the forward motion signal $MOT_f$, and the backward motion signal $MOT_b$.

The total motion signal $MOT_o$ indicates the motion among the center frame and all of its forward and backward neighboring frames within the time interval. The forward motion signal $MOT_f$ indicates the motion among the center frame and its forward neighboring frames within the time interval. The backward motion signal $MOT_b$ indicates the motion among the center frame and its backward neighboring frames within the time interval (the motion detector 120 can use a global noise statistics σ which can be calculated using a separate noise estimation unit 140).

The filter control unit 130 determines which of the temporal averages $AVG_0$, $AVG_f$, $AVG_b$, to use as the final output based on the three motion signals $MOT_0$, $MOT_f$, $MOT_b$, generated by the motion detector 120, as described herein.

In the example where N=5, the bidirectional temporal filter 110 uses frames $F_0$, $F_1$, $F_2$, $F_3$, which are stored in frame memory units 150, 160, 170, 180 (e.g., FM0, FM1, FM2 and FM3) (FIG. 2), and the incoming frame $F_4$ to compute the total average $AVG_0$, the forward average $AVG_f$, and the backward average $AVG_b$ for each pixel (i,j) according to relations (1) through (3) below:

$$AVG_0(i,j) = (F_0(i,j) + F_1(i,j) + F_2(i,j) + F_3(i,j) + F_4(i,j))/5, \qquad (1)$$

$$AVG_f(i,j) = (F_0(i,j) + F_1(i,j) + F_2(i,j))/3, \qquad (2)$$

$$AVG_b(i,j) = (F_2(i,j) + F_3(i,j) + F_4(i,j))/3, \qquad (3)$$

wherein i, j are row and column indices, respectively. The example above is for N=5, which is the total number of frames, and 3 is the number of forward (backward) frames.

The output values, $AVG_0$, $AVG_f$, and $AVG_b$, of the bidirectional temporal filter 110 are supplied to the filter control unit 130.

Figure 3:
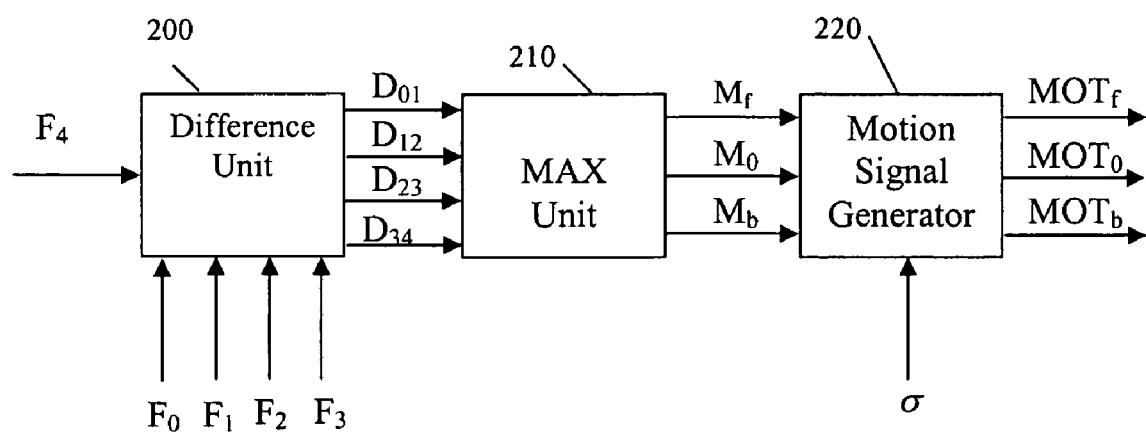
FIG. 3 shows a functional block diagram of an example embodiment of the motion detector in the system of FIG. 2.

The motion detector 120 detects three types of motion: total motion (e.g., motion among all frames $F_0$, $F_1$, $F_2$, $F_3$, $F_4$), forward motion (e.g., motion among the frames $F_0$, $F_1$, $F_2$), and backward motion (e.g., motion among the frames $F_2$, $F_3$, $F_4$). FIG. 3 shows a block diagram of an example embodiment of the motion detector 120 comprising a difference unit 200, a max unit 210 and a motion signal generator 220. The difference unit 200 determines box difference values $D_{01}$, $D_{12}$, $D_{23}$ and $D_{34}$, over a W×H (e.g., 3×3) window of each pair of consecutive frames according to relations (4) through (7) below:

$$D_{01}(i,j) = \left( \sum_{n=-W/2}^{W/2} \sum_{m=-H/2}^{H/2} |F_0(i+m, j+n) - F_1(i+m, j+n)| \right) \Big/ (W \cdot H). \qquad (4)$$

$$D_{12}(i,j) = \left( \sum_{n=-W/2}^{W/2} \sum_{m=-H/2}^{H/2} |F_1(i+m, j+n) - F_2(i+m, j+n)| \right) \Big/ (W \cdot H). \qquad (5)$$

$$D_{23}(i,j) = \left( \sum_{n=-W/2}^{W/2} \sum_{m=-H/2}^{H/2} |F_2(i+m, j+n) - F_3(i+m, j+n)| \right) \Big/ (W \cdot H). \qquad (6)$$

$$D_{34}(i,j) = \left( \sum_{n=-W/2}^{W/2} \sum_{m=-H/2}^{H/2} |F_3(i+m, j+n) - F_4(i+m, j+n)| \right) \Big/ (W \cdot H). \qquad (7)$$

Then, the max unit 210 determines three maximum values $M_0$, $M_f$ and $M_b$, from the four difference values $D_{01}$, $D_{12}$, $D_{23}$, $D_{34}$, according to relations (8) through (10) below:

$$M_0(i,j) = \max(D_{01}(i,j), D_{12}(i,j), D_{23}(i,j), D_{34}(i,j)) \qquad (8)$$

$$M_f(i,j) = \max(D_{01}(i,j), D_{12}(i,j)) \qquad (9)$$

$$M_b(i,j) = \max(D_{23}(i,j), D_{34}(i,j)) \qquad (10)$$

In relations (8) through (10), the value $M_0$ is the maximum value of all the computed box differences ($D_{01}$, $D_{12}$, $D_{23}$, $D_{34}$). The value $M_f$ is the maximum value of the first half of the computed box differences ($D_{01}$, $D_{12}$). The value $M_b$ is the maximum value of the second half of the computed box differences ($D_{23}$, $D_{34}$).

The outputs, $M_0$, $M_f$, $M_b$, of the max unit 210 are supplied to the motional signal generator 220 to generate the total motion signal, $MOT_0$, the forward motion signal, $MOT_f$, and the backward motion signal, $MOT_b$, from the values $M_0$, $M_f$, $M_b$, respectively. The motion signal generator 220 is also supplied with the global noise standard deviation σ, wherein the global noise standard deviation σ can be calculated using a separate noise estimation unit, such as that described in co-pending patent application Ser. No. 10/697,362, filed Oct. 30, 2003, titled: "Global and Local Statistics Controlled Noise Reduction System", incorporated herein by reference.

Using the global noise standard deviation $\sigma$ and the values $M_0$, $M_f$, $M_b$, the motion signal generator 220 computes the motion signals $MOT_0$, $MOT_f$, and $MOT_b$, according to relations (11) through (13) below:

$$MOT_0(i,j)=\min[T_2(\sigma)-T_1(\sigma),\max(M_0(i,j)-T_1(\sigma),0)]/[T_2(\sigma)-T_1(\sigma)]. \quad (11)$$

$$MOT_f(i,j)=\min[T_2(\sigma)-T_1(\sigma),\max(M_f(i,j)-T_1(\sigma),0)]/[T_2(\sigma)-T_1(\sigma)]. \quad (12)$$

$$MOT_b(i,j)=\min[T_2(\sigma)-T_1(\sigma),\max(M_b(i,j)-T_1(\sigma),0)]/[T_2(\sigma)-T_1(\sigma)]. \quad (13)$$

In relations (11) through (13), the function min(a,b) returns the smaller one of the two values a and b, the function max(a,b) returns the larger one of the two values a and b; and the functions $T_1(\sigma)$ and $T_2(\sigma)$ are lower and upper threshold values, respectively, depend on the global noise standard deviation $\sigma$. For example, $T_1(\sigma)$ and $T_2(\sigma)$ can be selected such that $T_1(\sigma)=c_1 \cdot \sigma$ and $T_2(\sigma)=c_2 \cdot \sigma$, with appropriately chosen constants $c_1$ and $c_2$. Preferably, the constants $c_1$ and $c_2$ are selected whereby $T_1(\sigma)$ and $T_2(\sigma)$ represent the threshold values for no-motion and motion, respectively.

Figure 4:
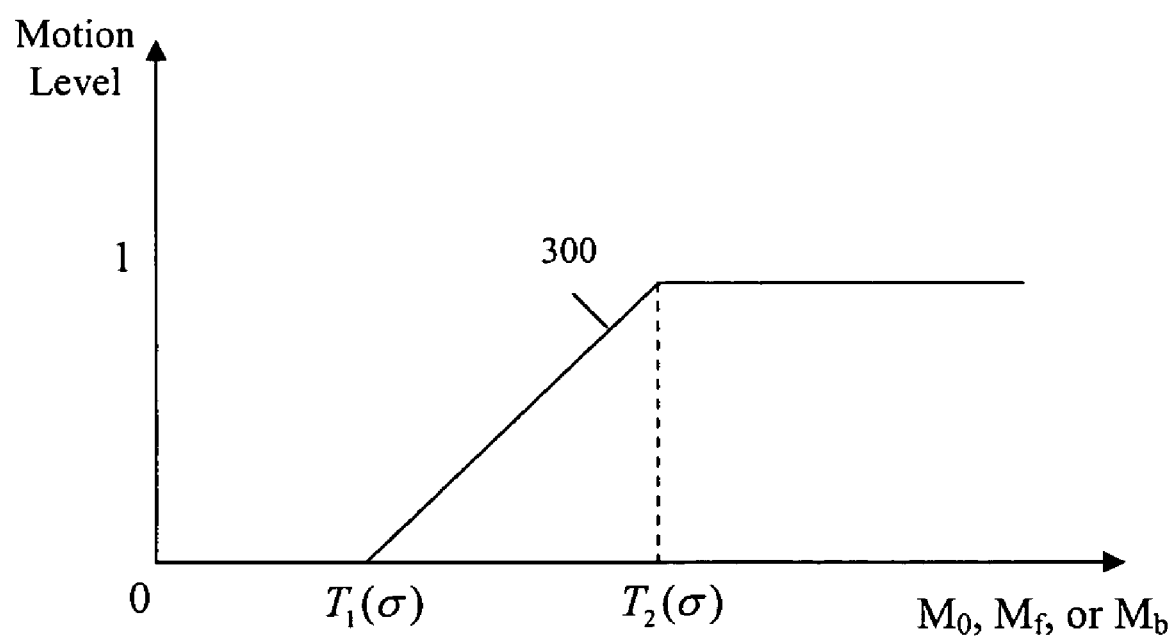
FIG. 4 shows an example graphic curve of the motion signal generated by the motion detector of FIG. 3.

FIG. 4 shows an example curve 300 representing the general shape of the generated motion signals $MOT_0$, $MOT_f$, and $MOT_b$. The values of all the motion signals $MOT_0$, $MOT_f$, and $MOT_b$, are limited to between e.g. 0 and 1, wherein a 0 value indicates no motion and a 1 value indicates strong motion. The motion level increases as the value of motion signal increases.

Referring back to FIG. 2, the output motion signals, $MOT_0$, $MOT_f$, $MOT_b$, of the motion detector 120 are supplied to the filter control unit 130 along with the outputs, $AVG_0$, $AVG_f$, $AVG_b$, of the bidirectional temporal filter 110, wherein the filter control unit 130 chooses among the corresponding temporal average values $AVG_0$, $AVG_f$, $AVG_b$, as the final output based on the motional signal values $MOT_0$, $MOT_f$, $MOT_b$.

If the total motion signal $MOT_0$ is small (e.g., less than $\sigma$), then the filter control unit 130 selects the total average $AVG_0$ as the final output, otherwise, the filter control unit further 130 checks the forward motion signal $MOT_f$. If the forward motion signal $MOT_f$ is small (e.g., less than $\sigma$), then the filter control unit 130 selects the forward average $AVG_f$ as the final output, otherwise, the filter control unit further checks the backward motion signal $MOT_b$. If the backward motion signal $MOT_b$ is small (e.g., less than $\sigma$), then the filter control unit 130 selects the backward average $AVG_b$ as the final output, otherwise, the filter control unit 130 switches off the temporal filter 110, and the pixel value of the center frame (e.g., $F_2$), is bypassed as the final output.

In selecting the output value, a soft switching implementation in the filter control unit 130 can be performed according to relations (14) through (16) below:

$$A(i,j)=(1-MOT_b(i,j)) \cdot AVG_b(i,j)+MOT_b(i,j) \cdot F_c(i,j). \quad (14)$$

$$B(i,j)=(1-MOT_f(i,j)) \cdot AVG_f(i,j)+MOT_f(i,j) \cdot A(i,j). \quad (15)$$

$$F_{OUT}(i,j)=(1-MOT_0(i,j)) \cdot AVG_0(i,j)+MOT_0(i,j) \cdot B(i,j). \quad (16)$$

In relations (14) through (16), $F_C$ represents the center frame (e.g., $F_2$ in the 5-frame example), and $F_{OUT}$ is the final output.

To continue to process the next frame, the frame memory units, FM0, FM1, FM2, and FM3 (FIG. 2), are updated as follows: the frame stored in FM1 is copied to FM0, the frame stored in FM2 is copied to FM1, the frame stored in FM3 is copied to FM2, and the input frame in copied to FM3. Then the above process is repeated until the frames are processed.

When an object is moving along a certain direction in a video sequence, the forward motion signal indicates motion at the moving boundary behind the moving object in the current frame. In this case, the forward average can not be used, leaving the noise tail behind the moving object. However, in this situation, there is no motion at the same boundary location in the following (future) frames. Therefore, the backward motion signal indicates no motion, and when the backward average is applied, the noise tail is essentially removed according to an embodiment of the present invention.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for reducing video noise in a sequence of video frames, comprising the steps of:
   (a) computing multiple temporal average values for the video frames in different temporal directions;
   (b) computing multiple motion signal values for the video frames in different temporal directions;
   (c) selecting one of the temporal average values based on the motion signal values; and
   (d) outputting the selected temporal average value.

2. The method of claim 1, wherein step (a) of computing multiple temporal average values further comprises the steps of:
   computing a total average value using temporal averaging of a center frame and its forward and backward neighboring frames within a time interval;
   computing a forward average value using temporal averaging of the center frame and its forward neighboring frames within the time interval; and
   computing a backward average value using temporal averaging of the center frame and its backward neighboring frames within the time interval.

3. The method of claim 1, wherein step (b) of computing multiple motion signal values further includes the steps of:
   computing a total motion signal value representing the motion among a center frame and its forward and backward neighboring frames within a time interval;
   computing a forward motion signal value representing the motion among the center frame and its forward neighboring frames within the time interval; and
   computing a backward motion signal value representing the motion among the center frame and its backward neighboring frames within the time interval.

4. The method of claim 3, wherein computing the total motion signal value further includes the steps of:
   computing box differences over a W×H window of each pair of consecutive frames within the time interval;
   selecting the maximum values of the computed box differences; and
   using a nonlinear function to generate the total motion signal value from the selected maximum values.

5. The method of claim 4, wherein the nonlinear function has the form $\min[T_2(\sigma)-T_1(\sigma),\max(MAX-T_1(\sigma),0)]/[T_2(\sigma)-T_1(\sigma)]$, wherein MAX represents the corresponding selected maximum values, $T_1(\sigma)$ and $T_2(\sigma)$ represent lower and upper threshold values, respectively, that depend on a global noise standard deviation $\sigma$.

6. The method of claim 3, wherein computing the forward motion signal value further includes the steps of:
computing box differences over a W×H window of each pair of consecutive frames within the time interval;
selecting the maximum values of a plurality of the computed box differences; and
using a nonlinear function to generate the forward motion signal value from the selected maximum values.

7. The method of claim 6, wherein selecting the maximum values includes the steps of selecting the maximum values among the first half of the computed box differences.

8. The method of claim 6, wherein the nonlinear function has the form $\min[T_2(\sigma)-T_1(\sigma), \max(MAX-T_1(\sigma),0)]/[T_2(\sigma)-T_1(\sigma)]$, wherein MAX represents the corresponding selected maximum values, $T_1(\sigma)$ and $T_2(\sigma)$ represent lower and upper threshold values, respectively, that depend on a global noise standard deviation $\sigma$.

9. The method of claim 3, wherein computing the back motion signal value further includes the steps of:
computing box differences over a W×H window of each pair of consecutive frames within the time interval;
selecting the maximum values of a plurality of the computed box differences; and
using a nonlinear function to generate the back motion signal value from the selected maximum values.

10. The method of claim 9, wherein selecting the maximum values includes the steps of selecting the maximum values among the second half of the computed box differences.

11. The method of claim 9, wherein the nonlinear function has the form $\min[T_2(\sigma)-T_1(\sigma), \max(MAX-T_{1(\sigma)},0)]/[T_2(\sigma)-T_1(\sigma)]$, wherein MAX represents the corresponding selected maximum values, $T_1(\sigma)$ and $T_2(\sigma)$ represent lower and upper threshold values, respectively, that depend on a global noise standard deviation $\sigma$.

12. The method of claim 2, wherein the step of selecting one of the temporal average values based on the motion signal values further includes the steps of:
if the total motion signal value is within a first range, then selecting the total average value as the output;
otherwise, if the forward motion signal value is within a second range, then selecting the forward average value as output;
otherwise, if the backward motion signal value is within a third range, then selecting the backward average value as the output;
otherwise, selecting the current pixel value of a center frame as the output.

13. The method of claim 12, wherein selecting one of the temporal average values as the output, $F_{OUT}$, is according to the following relations:

$$A(i,j)=(1-MOT_b(i,j)) \cdot AVG_b(i,j)+MOT_b(i,j) \cdot F_C(i,j);$$

$$B(i,j)=(1-MOT_f(i,j)) \cdot AVG_f(i,j)+MOT_f(i,j) \cdot A(i,j);$$

$$F_{OUT}(i,j)=(1-MOT_0(i,j)) \cdot AVG_0(i,j)+MOT_0(i,j) \cdot B(i,j);$$

wherein:
$AVG_0$ is the total average value,
$AVG_f$ is the forward average value,
$AVG_b$ is the backward average value,
$MOT_0$ is the total motion signal value,
$MOT_f$ is the forward motion signal value,
$MOT_b$ is the backward motion signal value,
i,j are index values of a pixel location in a two-dimensional frame, and
$F_C$ is the center frame.

14. A system for reducing video noise in a sequence of video frames, comprising:
a temporal filter that computes multiple temporal average values for the video frames in different temporal directions;
a motion detector that computes multiple motion signal values for the video frames in different temporal directions; and
a control unit that selects one of the temporal average values based on the motion signal values as output.

15. The system of claim 14, wherein the temporal filter computes multiple temporal average values by:
computing a total average value using temporal averaging of a center frame and its forward and backward neighboring frames within a time interval;
computing a forward average value using temporal averaging of the center frame and its forward neighboring frames within the time interval; and
computing a backward average value using temporal averaging of the center frame and its backward neighboring frames within the time interval.

16. The system of claim 14, wherein the motion detector further computes the multiple motion signal values by:
computing a total motion signal value representing the motion among a center frame and its forward and backward neighboring frames within a time interval;
computing a forward motion signal value representing the motion among the center frame and its forward neighboring frames within the time interval; and
computing a backward motion signal value representing the motion among the center frame and its backward neighboring frames within the time interval.

17. The system of claim 16, wherein the motion detector further computes the total motion signal value by:
computing box differences over a W×H window of each pair of consecutive frames within the time interval;
selecting the maximum values of the computed box differences; and
using a nonlinear function to generate the total motion signal value from the selected maximum values.

18. The system of claim 17, wherein the nonlinear function has the form $\min[T_2(\sigma)-T_1(\sigma), \max(MAX-T_1(\sigma),0)]/[T_2(\sigma)-T_1(\sigma)]$, wherein MAX represents the corresponding selected maximum values, $T_1(\sigma)$ and $T_2(\sigma)$ represent lower and upper threshold values, respectively, that depend on a global noise standard deviation $\sigma$.

19. The system of claim 16, wherein the motion detector further computes the forward motion signal value by:
computing box differences over a W×H window of each pair of consecutive frames within the time interval;
selecting the maximum values of a plurality of the computed box differences; and
using a nonlinear function to generate the forward motion signal value from the selected maximum values.

20. The system of claim 19, wherein the motion detector selects the maximum values by selecting the maximum values among the first half of the computed box differences.

21. The system of claim 19, wherein the nonlinear function has the form $\min[T_2(\sigma)-T_1(\sigma), \max(MAX-T_1(\sigma),0)]/[T_2(\sigma)-T_1(\sigma)]$, wherein MAX represents the corresponding selected maximum values, $T_1(\sigma)$ and $T_2(\sigma)$ represent lower and upper threshold values, respectively, that depend on a global noise standard deviation $\sigma$.

22. The system of claim 16, wherein the motion detector further computes the back motion signal value by:
- computing box differences over a W×H window of each pair of consecutive frames within the time interval;
- selecting the maximum values of a plurality of the computed box differences; and
- using a nonlinear function to generate the back motion signal value from the selected maximum values.

23. The system of claim 22, wherein the motion detector further selects the maximum values by selecting the maximum values among the second half of the computed box differences.

24. The system of claim 22, wherein the nonlinear function has the form $\min[T_2(\sigma)-T_1(\sigma),\max(MAX-T_1(\sigma),0)]/[T_2(\sigma)-T_1(\sigma)]$, wherein MAX represents the corresponding selected maximum values, $T_1(\sigma)$ and $T_2(\sigma)$ represent lower and upper threshold values, respectively, that depend on a global noise standard deviation $\sigma$.

25. The system of claim 15, wherein the of selecting one of the temporal average values based on the motion signal values further includes the steps of:
- if the total motion signal value is within a first range, then selecting the total average value as the output;
- otherwise, if the forward motion signal value is within a second range, then selecting the forward average value as output;
- otherwise, if the backward motion signal value is within a third range, then selecting the backward average value as the output;
- otherwise, selecting the current pixel value of a center frame as the output.

26. The system of claim 25, wherein the control unit selects among one of the temporal average values as the output $F_{OUT}$, according to the following relations:

$$A(i,j)=(1-MOT_b(i,j)) \cdot AVG_b(i,j)+MOT_b(i,j) \cdot F_C(i,j);$$

$$B(i,j)=(1-MOT_f(i,j)) \cdot AVG_f(i,j)+MOT_f(i,j) \cdot A(i,j);$$

$$F_{OUT}(i,j)=(1-MOT_0(i,j)) \cdot AVG_0(i,j)=MOT_0(i,j) \cdot B(i,j);$$

wherein:
- $AVG_0$ the total average value,
- $AVG_f$ is the forward average value,
- $AVG_b$ is the backward average value,
- $MOT_0$ is the total motion signal value,
- $MOT_f$ is the forward motion signal value,
- $MOT_b$ is the backward motion signal value,
- i,j are index values of a pixel location in a two-dimensional frame, and
- $F_C$ is the center frame.

* * * * *